United States Patent

Gorbaty et al.

Patent Number: 5,288,773
Date of Patent: Feb. 22, 1994

[54] SULFONATED UNHYDROGENATED COPOLYMERS OF STYRENE AND BUTADIENE

[75] Inventors: Martin L. Gorbaty, Westfield; Dennis G. Peiffer, Annandale, both of N.J.

[73] Assignee: Exxon Research and Engineering Company, Florham Park, N.J.

[21] Appl. No.: 940,403

[22] Filed: Sep. 3, 1992

Related U.S. Application Data

[63] Continuation-in-part of Ser. No. 846,365, Mar. 5, 1992, abandoned, and a continuation-in-part of Ser. No. 846,366, Mar. 5, 1992, abandoned.

[51] Int. Cl.$^5$ .................. C08L 25/10; C08L 95/00
[52] U.S. Cl. .......................... 524/68; 524/59; 524/70; 524/71
[58] Field of Search .................. 524/68, 59, 70, 71

[56] References Cited

U.S. PATENT DOCUMENTS

| | | | |
|---|---|---|---|
| 3,642,953 | 2/1972 | O'Neill et al. | 525/96 |
| 4,371,641 | 2/1983 | Boyer | 524/70 |
| 4,514,308 | 4/1985 | Clampitt et al. | 524/68 |
| 4,741,868 | 5/1988 | Rooney | 562/33 |
| 5,070,123 | 12/1991 | Moran | 524/68 |

OTHER PUBLICATIONS

EP Application No. 93301629.7 Search Report dated Jul. 5, 1993.
EP-A-04412 85, Dow Chemical, Aug. 14, 1991.

Primary Examiner—Paul R. Michl
Assistant Examiner—Olga Asinovsky
Attorney, Agent, or Firm—Linda M. Scuorzo

[57] ABSTRACT

This invention relates to polymeric compositions comprising unhydrogenated or substantially unhydrogenated sulfonated copolymers of (poly)styrene and a (poly)conjugated diene, e.g., (poly)butadiene or (poly)isoprene, preferably (poly)butadiene containing less than about 1.0 wt. %, preferably less than about 0.8 wt. % sulfur, preferably from about 0.2 to about 0.7, more preferably from about 0.22 to about 0.6 wt. % sulfur, as well as base-neutralized products thereof. The invention includes the polymeric compositions produced by the process of sulfonating unhydrogenated copolymers of (poly)styrene and a conjugated diene, e.g., (poly)butadiene or (poly)isoprene, preferably (poly)butadiene, which process optionally includes base neutralizing the sulfonated copolymer. This invention further relates to the process for making these novel copolymers comprising combining an unhydrogenated or substantially unhydrogenated copolymer of (poly)styrene and a conjugated diene, e.g., (poly)butadiene or (poly)isoprene, preferably (poly)butadiene and an effective amount of sulfonating agent in an amount for a time, temperature and under conditions sufficient to sulfonate the copolymer and, optionally, neutralizing the sulfonated copolymer. This invention uses the copolymers herein in block form, i.e., diblock; (linear or radial) triblock, multiblock.

12 Claims, No Drawings

SULFONATED UNHYDROGENATED COPOLYMERS OF STYRENE AND BUTADIENE

CROSS-REFERENCE TO RELATED APPLICATIONS

This case is a Continuation-in-Part of U.S. Ser. No. 846,365 and U.S. Ser. No. 846,366, filed Mar. 5, 1992.

FIELD OF THE INVENTION

This invention is concerned with the process of producing sulfonated linear and radial block copolymers, with the resulting novel sulfonated polymeric compositions, including the products produced by the processes disclosed herein and with certain uses thereof.

SUMMARY OF THE INVENTION

This invention relates to polymeric compositions comprising unhydrogenated or substantially unhydrogenated sulfonated copolymers of (poly)styrene and a conjugated diene, e.g., (poly)butadiene or (poly)isoprene, preferably (poly)butadiene wherein the copolymer contains less than about 1.0 wt. %, preferably less than about 0.8 wt. % bound sulfur, preferably from about 0.2 to about 0.7, more preferably from about 0.22 to about 0.6 wt. % sulfur, as well as base-neutralized products thereof. These novel polymeric compositions are hereinafter also referred to as the "sulfonated copolymer". The invention includes the foregoing polymeric compositions produced by the process of sulfonating unhydrogenated copolymers of (poly)styrene and a conjugated diene, e.g., (poly)butadiene or (poly)isoprene, preferably (poly)butadiene, which process comprises base neutralizing the copolymer. This invention further relates to the process for making these novel copolymers comprising combining an unhydrogenated or substantially unhydrogenated copolymer of (poly)styrene and a conjugated diene, e.g., (poly)butadiene or (poly)isoprene, preferably (poly)butadiene and an effective amount of sulfonating agent for a time, temperature and under conditions sufficient to form the sulfonated copolymer and, optionally, neutralizing the resulting sulfonated copolymer with an effective amount of a suitable basic neutralizing agent. The (poly)styrene-(poly)butadiene copolymer may be made by a number of ways known in the art. (Poly)styrene-(poly)butadiene copolymers are available in random and block form. This invention uses the copolymers in block form, e.g., diblock; and linear or radial triblock.

The copolymers of the present invention, particularly sulfonated radial block copolymers of (poly)styrene-(poly)butadiene(poly)styrene (S-B-S), have utility as asphalt additives and have been used herein to produce novel polymer modified asphaltic compositions that are storage stable, have viscosities of about 150 cPs to about 2000 cPs and from about 3000 cPs to about 8000 cPs at 135° C. and have softening points of greater than about 55° C. to about 65° C. (as a binder for dense graded pavement) and from about 60° to about 75° C. (as a binder for open graded pavement). "Storage stability" means the formation of a continuous phase or two continuous phases that do not separate on standing for a period of time, usually 3-5 days at the specified temperature, usually 160° C. (320° F.) and are suitable for use in road paving and roofing applications.

DETAILED DESCRIPTION OF THE INVENTION

In accordance with the present invention are provided certain novel sulfonated copolymers of (poly)styrene and a (poly)conjugated diene, hereinafter "conjugated diene" or (poly)conjugated diene", such as (poly)isoprene or (poly)butadiene, preferably (poly)butadiene and the base-neutralized forms thereof having a sulfonation level of less than about 1 wt. % of bound sulfur (which corresponds to 31 meq $SO_3H$/100 g copolymer), preferably less than 0.8 wt. %, more preferably from about 0.2 to about 0.7, most preferably from about 0.22 to about 0.6 wt. % sulfur, and wherein the conjugated diene blocks are unhydrogenated or substantially unhydrogenated. Herein, the copolymers are used in block form. The present invention includes the products produced by the process of sulfonation, and by the process of sulfonation and base-neutralization of the resulting sulfonated copolymer. As used herein, the term "unhydrogenated" means none of the olefinic unsaturation in the starting copolymer has been saturated and the term "substantially unhydrogenated" means less than about 25%, preferably less than about 10% of the olefinic unsaturation in the starting copolymer has been saturated.

All starting materials stated herein may be obtained from commercial sources or prepared by procedures known to one skilled in the art. (Poly)styrene-(poly)butadiene starting materials are available in block or random form. The random form of (poly)styrene(poly)butadiene is known as SBR (styrene-butadiene rubber). Block and random copolymer starting materials disclosed herein may be assembled according to processes known to one skilled in the art or the starting copolymers may be purchased commercially. The block copolymers utilized in the formation of the sulfonated copolymers of the present invention must have a block of an unhydrogenated or substantially unhydrogenated conjugated diene such as (poly)isoprene or (poly)butadiene, preferably (poly)butadiene, separating the blocks of a (poly)styrene.

The starting copolymer typically should have a minimum number average molecular weight of equal to or greater than 70,000 and range of from about 60,000 to about 250,000. The amount of the (poly)styrene component should be selected to avoid producing a polymer that is unacceptably hard or glassy under the use conditions disclosed herein, as this characteristic is undesirable in asphaltic compositions used for road paving materials. Typically, about 5-50 wt. % of the copolymer will be (poly)styrene with the remainder the conjugated diene, e.g., (poly)butadiene or (poly)isoprene. One of ordinary skill in the art, given the teachings herein, would be able to select the appropriate weight percent of (poly)styrene in the copolymer. The copolymer to be sulfonated may be any unhydrogenated or substantially unhydrogenated block copolymer of (poly)styrene and a conjugated diene such as (poly)butadiene; e.g., (poly)styrene-(poly)butadiene diblock ("SB"), (poly)styrene-(poly)butadiene-(poly)styrene linear or radial triblock ("SBS").

Further, in accordance with the present invention, a process for sulfonating unhydrogenated or substantially unhydrogenated block copolymers of (poly)styrene and a conjugated diene to the sulfonation level specified herein is provided. The process comprises forming a mixture of the starting materials to be sulfonated and an effective amount of an appropriate sulfonating agent, and reacting same for a time, at a temperature and otherwise under conditions sufficient to produce the sulfonated unhydrogenated block copolymers of the present invention. Generally, a stoichiometric amount of sulfonating agent is sufficient. However, in all cases, it is necessary to sulfonate the copolymers to a level below which the copolymer is water swellable or water soluble at 25° C., as these characteristics are not desirable in copolymers used as additives for asphalt blends for road paving and roofing applications. Applicants have found that this requires a sulfonation level of significantly less than 1.0 wt. %. The degree of sulfonation may be controlled by the proportion of sulfonating agent relative to olefinic unsaturation present. It is recommended for the road paving and roofing applications discussed herein to sulfonate to a level of from greater than 0 to less than about 1.0 wt. % of bound sulfur, preferably less than 0.8 wt. %, preferably from about 0.2 to about 0.7 wt. % sulfur, more preferably from about 0.22 to about 0.6 wt. % sulfur. The broad range corresponds to from greater than zero to less than about 31 meq $SO_3H$/100 g copolymer.

The starting copolymers may be dissolved in a solvent that is inert or nonreactive to the process, e.g., hydrocarbons such as hexane, isopentane, heptane or cyclohexane, 1,2-dichloroethane or mixtures thereof, with addition of sulfonating agent thereto. The concentration of the starting unsulfonated copolymer solution used in the process of the present invention is not critical, but must be such that the viscosity of the polymer solution is sufficiently low to permit adequate mixing between the copolymer and the sulfonating agent. Generally, concentrations of from about 5-20 wt. % of the starting copolymer in the total mixture are within an acceptable range. The sulfonating agent itself may be prepared ex situ or in situ. Appropriate sulfonating agents for the polymer are, for example, complexes of sulfuric acid, or acyl sulfates, preferably acetyl or propionyl sulfate or a combination of reagents that will produce the sulfonating agent in situ under the process conditions necessary for the present invention. See, e.g., U.S. Pat. Nos. 3,642,728 and 3,836,511 for information generally related to the sulfonation of polymers.

Sulfonation of the unhydrogenated starting copolymer is optionally carried out with reasonable rates of reaction at temperatures on the order of from about −100° C. to about 100° C., depending the particular starting materials, typically from about 20° C. to about 60° C., more typically about 25° C. to about 55° C. The time of reaction is normally between instantaneous reaction and up to about two hours, depending on the starting copolymer and degree of sulfonation desired. The reactants must be thoroughly mixed, for example, by vigorous stirring or agitation, in order to achieve satisfactory contact between the copolymer and the sulfonating agent.

The resulting novel copolymer is an unsaturated (unhydrogenated) block copolymer sulfonic acid which was converted to the base-neutralized (i.e., neutral) form using an effective amount, generally a stoichiometric amount or a slight excess of an appropriate basic neutralizing agent for a time, at a temperature and under reaction conditions sufficient to produce the base-neutralized (i.e., neutral) form of the novel copolymers.

These unsaturated block copolymer sulfonic acids obtained are subject to rapid degradation under certain conditions such as when dry or at temperatures above about 60° C.; therefore, they should be handled in solution below about 60° C. until used or converted to a more stable form, e.g., by neutralization or ion-exchange. Optionally neutralization of the sulfonated copolymer may be performed and the neutral form of the copolymer is included within the scope of the present invention. This is accomplished using an appropriate basic neutralizing agent, or combination of agents such as ammonia, amines, bases containing cations having a valence of +1, +2 or +3. These suitably may be selected from the group consisting of Groups IA, IIA, IIIA, IB through VIIB and VIII of the Periodic Table, and mixtures thereof and may be added to form a neutral form of the sulfonic acid copolymer. A preferred basic neutralizing agent is one that contains monovalent or divalent cations, preferably divalent cations, more preferably $Zn^{+2}$, $Ca^{+2}$, $Ba^{+2}$, $Mg^{+2}$, most preferably $Zn^{+2}$ and $Ca^{+2}$ and mixtures thereof. One having ordinary skill in the art would be able to select the appropriate neutralizing agent, or combination of agents. For example, suitable neutralizing agents for this purpose include calcium oxide, zinc oxide, or preferably zinc acetate. However, this invention is intended also to encompass the neutralized sulfonated copolymer in which cations may be exchanged or substituted for the cation contained in the initial basic neutralizing agent. Neutralization of sulfonated copolymers is further described in copending applications filed Mar. 5, 1992, Nos. 846,365 and 846,366 to Gorbaty et al.

The sulfonated unhydrogenated block copolymers have application as additives to produce novel polymer-modified asphaltic compositions having improved viscoelastic properties, softening points (i.e., softening points that do not vary more than 4° C. between top and bottom of the samples) and storage stability/compatibility (measured at 160° C.) as compared to the unsulfonated copolymers, thus making these polymer-modified asphalts more suitable for use in road paving and roofing applications, i.e., having viscosities at 135° C. of from about 150-2000 cPs and 3000-8000 cPs. The present invention includes such compositions.

The sulfonated unhydrogenated copolymers, including the neutralized sulfonated unhydrogenated copolymers, disclosed herein may be mixed with asphalts to form the novel sulfonated polymer unsulfonated asphalt compositions of the present invention. "Asphalt" is defined as including petroleum residue having a nominal atmospheric boiling point of at least 350° C., more typically above 440° C. The blends or mixtures may be made by conventional means known to ones skilled in the art and either the polymer may be base neutralized initially or the blend may be further treated with another suitable neutralizing agent, either directly or with a solution of said neutralizing agents such as those specified above to form the novel sulfonated polymer-unsulfonated asphalt blends. While up to 20 wt. % sulfonated unhydrogenated copolymer may be added, preferred in making polymer modified asphaltic compositions of the present invention suitable for road paving applications using the novel copolymers disclosed herein, is from about 2 wt. % to about 7 wt. %, more preferably from about 3 to about 5 wt% and for roofing applications is from about 4 wt. % to about 15 wt. % of total composition. Within the stated range, however, smaller amounts of copolymer generally make the resulting asphaltic composition more economical. It has been found that the radial SBS in the above amounts is particularly preferred in road paving applications for its ability to enhance the above properties of the resulting asphaltic composition.

In the present invention, softening point was used as a measure of compatibility between unsulfonated asphalt and sulfonated polymer. Thus, if the top third and bottom third of the sample showed softening points within a 4° C. variation, the asphalt and polymer were judged to be compatible. However, softening point data were supplemented by optical micrographs of the top and bottom segments of the asphaltic compositions in order to verify phase compatibility.

The following examples illustrate the preparation and pertinent properties of the sulfonated block copolymers as made by the process of the present invention.

EXAMPLE 1

Eighty grams of a radial triblock S-B-S copolymer (Vector 2411D, manufactured by Dexco, CAS numbers 009003-55-8 and 025038-32-8) of approximately a number average molecular weight of 200,000 were dissolved in 1280 ml of 1,2-dichloroethane. After heating the solution to 50° C., 2.4 ml of acetic anhydride were added followed by the dropwise addition of 1.1 ml of concentrated sulfuric acid. During the addition process and for one hour afterward, vigorous agitation was maintained. Neutralization was accomplished by addition of a solution of zinc acetate, prepared by dissolving 14.4 g of zinc acetate into a mixture of 43.2 ml of methanol and 4.0 ml of water, again using vigorous stirring conditions. After addition of neutralizing agent, the solution was further agitated for one hour. The sulfonated and neutralized unhydrogenated copolymer was isolated by steam stripping, i.e., pouring the solution into a bath of boiling water through which steam was continuously passed. The isolated copolymer was further washed with a large excess of distilled water and allowed to dry in air overnight. The copolymer was further dried at 100° C. in a vacuum oven for 24 hours. The sulfur content was determined by the Dietert sulfur analysis method to be 0.22 wt. % and the sulfonation level calculated from this value is 6.9 meq/100 g polymer.

EXAMPLE 2

A typical procedure for preparing the copolymer by preblending (i.e., prior to addition to asphalt) follows. One hundred grams of a radial triblock S-B-S copolymer, with an approximate number average molecular weight of 200,000 were dissolved in 700 mL of cyclohexane. To this solution was added dropwise and with vigorous stirring at 25° C. a solution of sulfonating agent, prepared by mixing in an addition funnel 5.5 g (5.4 mi) of propionic anhydride, 1.4 mL of concentrated sulfuric acid and 100 mL of methylene chloride. On completion of the addition, the orange solution was stirred for an additional 15 minutes, after which a solution of neutralizing agent, prepared from 18.0 g of zinc acetate, 54.0 mL of methanol and 3.0 mL of distilled water, was added and stirred for an additional one hour period. The sulfonated copolymer was isolated by steam stripping; i.e., pouring the solution into a bath of boiling water through which steam was continuously passed. The isolated copolymer was further washed with a large excess of distilled water and allowed to dry in air overnight. The final product was isolated by further drying at 100° C. in a vacuum oven for 24 hours. The sulfur level was determined by the Dietert sulfur analysis method to be 0.45 wt. %, and the sulfonation level calculated from this value is 14.0 meq/100 g polymer.

EXAMPLE 3

The following demonstrates the use of the sulfonated unhydrogenated block copolymer.

Polymer asphalt blends in this example were prepared from the same untreated (unsulfonated, unoxidized) starting bitumen, an asphalt (AC-10 feed from the Billings Refinery) with a penetration grade of 120/150. To about 308 g bitumen heated to 160° C., 3% by weight (9.25 g) of a Zinc neutralized sulfonated S-B-S radial triblock copolymer containing 0.4 wt. % sulfur was added with high shear stirring. After addition, 0.22 g of CaO was added and the mixture was stirred for an additional hour under high shear conditions. To another 333 g charge of the same bitumen sample, 9.99 g (3%) by weight of unsulfonated S-B-S radial triblock copolymer was added under identical conditions of temperature and high shear stirring. Softening points, viscosities and storage stability are shown in the table below. In this context, a polymer modified asphalt sample is considered to be storage stable for road paving applications if the softening points of the top and bottom thirds of a sample, stored for 4 days at 160° C., do not vary by more than 4° C. The sulfonated copolymer of this invention provides a storage stable blend with acceptable softening point and viscosity, while the unsulfonated copolymer does not produce a storage stable blend, and has a viscosity that is considerably lower.

| Polymer | Initial Softening Point (°F./°C.) | Viscosity(cPs) (at 135° C.) | Soft. Pt. (°F./°C.) Bottom-Top |
|---|---|---|---|
| Sulfonated | 148/64.4 | 1352 | 145-145/62.8-62.8 |
| Unsulfonated | 149/65.0 | 753 | 123-189/50.6-87.2 |

What is claimed is:

1. A sulfonated polymer composition comprising a sulfonated block copolymer of (poly)styrene and a conjugated diene having a sulfonation level below which the copolymer is water swellable, the (poly)conjugated diene having less than about 25% of the olefinic unsaturation in the starting block copolymer saturated, and base neutralized forms of the sulfonated block copolymer, and wherein the starting block copolymer is selected from the group consisting of linear diblock, linear triblock, and radial triblock, and wherein the (poly)conjugated diene is selected from the group consisting of (poly)isoprene and (poly)butadiene, the sulfonated block copolymer having less than 0.8% weight of bound sulfur.

2. The composition of claim 1 wherein the block copolymer has less than about 0.8% weight of bound sulfur.

3. The composition of claim 1 wherein the conjugated diene is (poly)butadiene.

4. A process for the preparation of a sulfonated block copolymer, which comprises: forming a mixture of an unsulfonated block copolymer of (poly)styrene and a conjugated diene having less than about 25% of the olefinic unsaturation in the block copolymer saturated, wherein the block copolymer is selected from the group consisting of linear diblock, linear triblock and radial triblock, and wherein the (poly)conjugated diene is selected from the group consisting of (poly)isoprene and (poly)butadiene and an effective amount of a sulfonating agent to sulfonate the copolymer to a level below which the copolymer is water swellable; and reacting the mixture for a time and at a temperature sufficient to form a sulfonated block copolymer of (poly)styrene and the (poly)conjugated diene selected from the group consisting of (poly)isoprene and (poly)butadiene, and having less than 0.8% of bound sulfur.

5. The process of claim 4 wherein the block copolymer has less than less than about 0.8 wt. % of bound sulfur.

6. The process of claim 3 wherein the acyl sulfate is prepared from effective amounts of acid anhydride and $H_2SO_4$.

7. The process of claim 4 further comprising neutralizing the sulfonated block copolymer with a basic neutralizing agent having cations of a valence of +1, +2 or +3.

8. A polymer-modified asphaltic composition comprising a neutral blend of an asphalt and a sulfonated block copolymer of (poly)styrene and (poly)conjugated diene, wherein less than about 25% of the olefinic unsaturation in the starting copolymer is saturated, and wherein the conjugated diene is selected from the group consisting of (poly)isoprene and (poly)butadiene in an amount of from about 2 wt. % to about 7 wt % of the total asphaltic composition, and wherein the sulfonated block copolymer has less than 1 wt % of bound sulfur.

9. The composition of claim 1 wherein the block copolymer has from about 0.2 to about 0.7 wt. % sulfur.

10. The composition of claim 1 wherein the block copolymer has from about 0.22 to about 0.6 wt. % sulfur.

11. The process of claim 4 wherein the conjugated diene is (poly)butadiene.

12. The composition of claim 8 wherein the sulfonated block copolymer is in base neutralized form.

* * * * *

UNITED STATES PATENT AND TRADEMARK OFFICE
CERTIFICATE OF CORRECTION

PATENT NO.   : 5,288,773
DATED        : February 22, 1994
INVENTOR(S)  : Gorbaty et al.

It is certified that error appears in the above-identified patent and that said Letters Patent is hereby corrected as shown below:

Column 6,
Lines 56-58, "claim 2" should be deleted.

Column 7,
Lines 10-12, "claim 5" should be deleted.
Line 13, Claim 6 should be amended to replace the phrase "claim 3" with the phrase -- claim 4 --, and to insert the phrase -- wherein the sulfonating agent comprises acyl sulfate, -- before the phrase "wherein the acyl sulfate."

Signed and Sealed this

First Day of April, 2003

JAMES E. ROGAN
*Director of the United States Patent and Trademark Office*